United States Patent
Liu

(10) Patent No.: US 10,725,552 B2
(45) Date of Patent: Jul. 28, 2020

(54) TEXT INPUT METHOD AND DEVICE BASED ON GESTURE RECOGNITION, AND STORAGE MEDIUM

(71) Applicant: SHENZHEN PRTEK CO. LTD., Shenzhen (CN)

(72) Inventor: Guohua Liu, Shenzhen (CN)

(73) Assignee: SHENZHEN PRTEK CO., LTD., Shenzhen (CN)

( * ) Notice: Subject to any disclaimer, the term of this patent is extended or adjusted under 35 U.S.C. 154(b) by 319 days.

(21) Appl. No.: 15/761,034

(22) PCT Filed: Aug. 24, 2016

(86) PCT No.: PCT/CN2016/096501
§ 371 (c)(1),
(2) Date: Mar. 16, 2018

(87) PCT Pub. No.: WO2017/045517
PCT Pub. Date: Mar. 23, 2017

(65) Prior Publication Data
US 2018/0260034 A1    Sep. 13, 2018

(30) Foreign Application Priority Data
Sep. 17, 2015 (CN) .......................... 2015 1 0593632

(51) Int. Cl.
*G06F 3/0488*     (2013.01)
*G06F 3/01*       (2006.01)
(Continued)

(52) U.S. Cl.
CPC ................ *G06F 3/017* (2013.01); *G06F 3/01* (2013.01); *G06F 3/0304* (2013.01);
(Continued)

(58) Field of Classification Search
CPC .... G06F 3/017; G06F 3/04883; G06F 3/0304; G06F 3/167; G06F 3/01; G06K 9/00355;
(Continued)

(56) References Cited

U.S. PATENT DOCUMENTS

2009/0040194 A1    2/2009  Shelton et al.
2009/0183929 A1*   7/2009  Zhang ................. G06F 3/03545
                                                       178/18.01
(Continued)

FOREIGN PATENT DOCUMENTS

CN     101354608 A    1/2009
CN     101739118 A    6/2010
(Continued)

OTHER PUBLICATIONS

International Search Report and Written Opinion and English translation thereof dated Oct. 31, 2016, in connection with International Application No. PCT/CN2016/096501, 16 pages.
(Continued)

*Primary Examiner* — Shaghayegh Azima
(74) *Attorney, Agent, or Firm* — Rimon PC

(57) ABSTRACT

A text input method based on gesture recognition, comprising: collecting image information containing a target object; determining the target object according to the image information, and acquiring a writing surface and a movement trace of the target object; extracting the movement trace of the target object in the writing surface as a writing trace and outputting same; and performing character recognition according to the writing trace, and outputting a character recognition result.

9 Claims, 7 Drawing Sheets

(51) Int. Cl.
*G06F 3/16* (2006.01)
*G06F 3/03* (2006.01)
*G06K 9/22* (2006.01)
*G06K 9/00* (2006.01)
*G06T 7/20* (2017.01)

(52) U.S. Cl.
CPC .......... *G06F 3/04883* (2013.01); *G06F 3/167* (2013.01); *G06K 9/00355* (2013.01); *G06K 9/00416* (2013.01); *G06K 9/224* (2013.01); *G06T 7/20* (2013.01); *G06K 2209/01* (2013.01); *G06K 2209/011* (2013.01)

(58) Field of Classification Search
CPC .............. G06K 9/00416; G06K 9/224; G06K 2209/01; G06K 2209/011; G06T 7/20
See application file for complete search history.

(56) References Cited

U.S. PATENT DOCUMENTS

| | | | |
|---|---|---|---|
| 2010/0156853 A1* | 6/2010 | Narusawa | G06F 3/0412 345/183 |
| 2010/0333163 A1 | 12/2010 | Daly | |
| 2014/0281946 A1* | 9/2014 | Avni | G06T 1/0021 715/268 |
| 2015/0248390 A1 | 9/2015 | Gormish et al. | |

FOREIGN PATENT DOCUMENTS

| | | |
|---|---|---|
| CN | 102279668 A | 12/2011 |
| CN | 103150010 A | 6/2013 |
| CN | 103226388 A | 7/2013 |
| CN | WO 2014/205639 A1 * | 12/2014 |
| CN | 105302298 A | 2/2016 |
| EP | 3 340 014 A1 | 6/2018 |
| JP | 2013-084146 A | 5/2013 |
| JP | 2018-535469 A | 11/2018 |
| TW | 200816062 A | 4/2008 |
| WO | 2012/151914 A1 | 11/2012 |
| WO | 2014205639 A1 | 12/2014 |
| WO | 2017/045517 A1 | 3/2017 |

OTHER PUBLICATIONS

International Preliminary Report on Patentability and English translation thereof dated Mar. 29, 2018 in connection with International Application No. PCT/CN2016/096501, 12 pages.

Chinese First Office Action for Chinese Application Serial No. 201510593632.8 dated Jul. 18, 2016, 11 pages. (Including English Translation).

Chinese Second Office Action for Chinese Application Serial No. 201510593632.8 dated Dec. 13, 2016, 8 pages. (Including English Translation).

Notification to Grant Patent Right for Invention for Chinese Application Serial No. 201510593632.8 dated Mar. 28, 2017, 4 pages (Including English Translation).

Nam Y, et al., "Recognition of Hand Gestures with 3D, Nonlinear Arm Movement," Pattern Recognition Letters, Amsterdam, NL, vol. 18, No. 1, Jan. 1, 1997, pp. 105-113.

European Patent Office, European Search report for European Application No. 16845631.7 dated Mar. 25, 2019.

* cited by examiner

TEXT INPUT METHOD AND DEVICE BASED ON GESTURE RECOGNITION, AND STORAGE MEDIUM

CROSS-REFERENCED APPLICATIONS

This application is a US national phase application under 35 U.S.C. § 371 of PCT/CN2016/096501 filed on Aug. 24, 2016, and titled TEXT INPUT METHOD AND DEVICE BASED ON GESTURE RECOGNITION AND STORAGE MEDIUM, which claims priority to Chinese Patent Application No. 201510593632.8 entitled "DEVICE AND METHOD FOR DISTINGUISHING STROKES IN AIR" and filed on Sep. 17, 2015, the contents of both being expressly incorporated by reference herein in its entirety.

TECHNICAL FIELD

The present disclosure is related to the computer recognition technology, and in particular related to a method, a device and a storage medium of inputting text based on hand gesture recognition.

BACKGROUND

With the development of computer science, more and more people are accustomed to effect the expression of text messages by a computer. Widely used inputting text means nowadays includes the keyboard, the touchscreen, the writing pad and so on, those means of inputting text have their respective disadvantages. Accordingly, designing a more naturalized, convenient and effective way of writing text in the air is important as a field of research.

However, as for a computer vision, the trace of a text writing in the air is consecutive, although the conventional text recognition technology is readily capable of recognizing the text consecutively written, the precision of recognition is yet to be improved.

SUMMARY

According to the various embodiments of the present disclosure, a method, a device and a storage medium of inputting text based on hand gesture recognition are provided.

A method of inputting text based on hand gesture recognition, the method includes:
  collecting image information containing a target object;
  determining the target object according to the image information, and acquiring a writing plane and a movement trace of the target object;
  extracting the movement trace of the target object in the writing plane as a writing trace, outputting the writing trace; and
  performing character recognition according to the writing trace, and outputting a character recognition result.

A device of inputting text based on hand gesture recognition, the device including a processor; and a memory storing instructions, which, when executed by the processor causes the processor to perform steps including:
  collecting image information containing a target object;
  determining the target object according to the image information, and acquiring a writing plane and a movement trace of the target object;
  extracting the movement trace of the target object in the writing plane as a writing trace, outputting the writing trace; and
  performing character recognition according to the writing trace, and outputting a character recognition result.

At least one non-transitory computer-readable storage medium storing computer-readable instructions that, when executed by at least one processors, cause the at least one processor to perform steps including:
  collecting image information containing a target object;
  determining the target object according to the image information, and acquiring a writing plane and a movement trace of the target object;
  extracting the movement trace of the target object in the writing plane as a writing trace, outputting the writing trace; and
  performing character recognition according to the writing trace, and outputting a character recognition result.

According to the foregoing method of inputting text based on hand gesture recognition, the target object is determined according to the image information, and the writing plane and the movement trace of the target object are acquired, the movement trace of the target object in the writing plane is extracted as the writing trace to be output, the character recognition is performed according to the writing trace, and the character recognition result is output, such that even if the movement trace of the target object in the air in consecutive, the trace extraction module can still extract the writing trace in the writing plane, which is equivalent to a strokes distinguishing process and facilitates the recognition of the character recognition module and improves the precision of recognition.

BRIEF DESCRIPTION OF THE DRAWINGS

To illustrate the technical solutions according to the embodiments of the present disclosure or in the prior art more clearly, the accompanying drawings for describing the embodiments or the prior art are introduced briefly in the following. Apparently, the accompanying drawings in the following description are only some embodiments of the present disclosure, and persons of ordinary skill in the art can derive other drawings from the accompanying drawings without creative efforts.

DETAILED DESCRIPTION OF THE EMBODIMENTS

Figure 1:
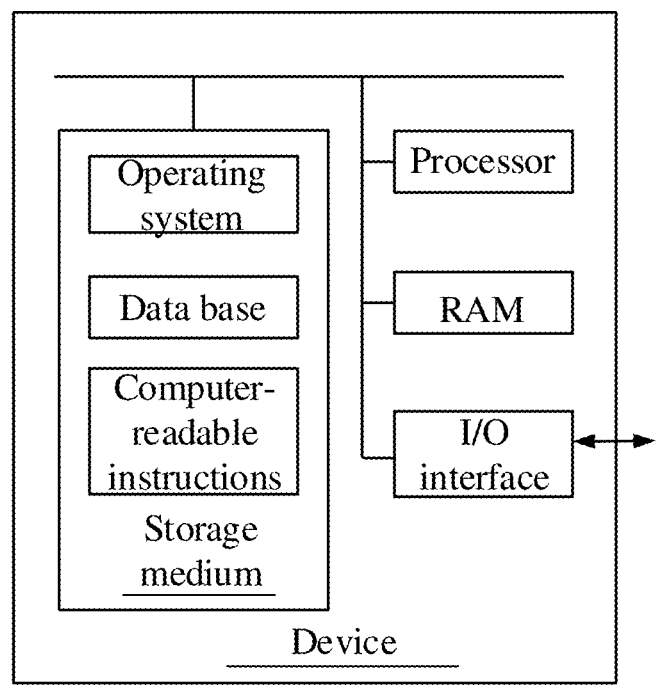
FIG. 1 is a schematic diagram of the device of inputting text based on hand gesture recognition according to an embodiment.

Embodiments of the disclosure are described more fully hereinafter with reference to the accompanying drawings.

Preferable embodiments are presented in the drawings. The various embodiments of the disclosure may, however, be embodied in many different forms and should not be construed as limited to the embodiments set forth herein. Rather, these embodiments are provided so that this disclosure will be thorough and complete, and will fully convey the scope of the disclosure to those skilled in the art.

Unless otherwise defined, all terms used herein have the same meaning as commonly understood by one of ordinary skill in the art to which this disclosure belongs. The terms used herein is for the purpose of describing the embodiments of the present disclosure, as opposed to limiting thereto. The language "and/or" used in the disclosure refers to any and all combinations of the one or multiple items listed.

FIG. 1 is a schematic diagram of the device of inputting text based on hand gesture recognition according to an embodiment.

In the present embodiment, the device of inputting text based on hand gesture recognition includes a processor, a storage medium, a Random Access Memory (RAM) and an input/output (I/O) interface connected through device bus. An operation device, a database and computer-readable instructions are stored in the storage medium of the device, the database is configured to store data, such as storing image information, movement trace and writing trace and so on. The processor of the device is configured to provide computation and control capability to support the operation of the entire device. The RAM of the terminal provides an operation environment for the computer-readable instructions in the storage medium. The I/O interface of the device is configured to connect other equipment.

Figure 2:
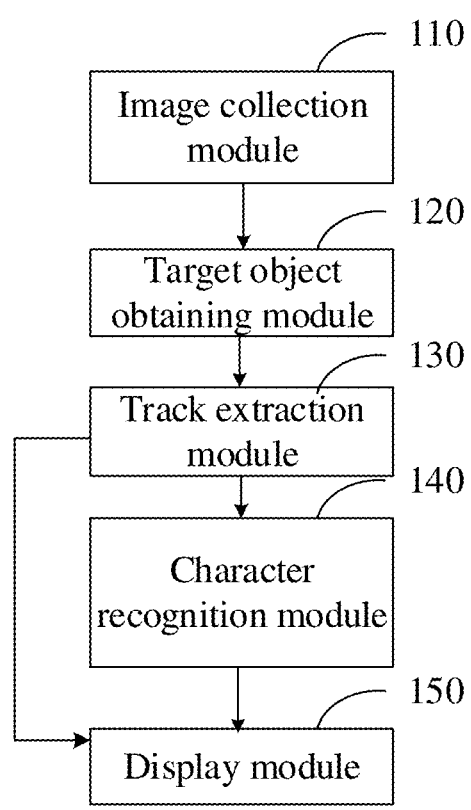
FIG. 2 is a block diagram of the device of inputting text based on hand gesture recognition according to an embodiment.

FIG. 2 is a block diagram of the device of inputting text based on hand gesture recognition according to an embodiment.

The internal structure of the device is corresponding to the structure shown in FIG. 1, all or a part of each of the module below can be implemented by way of software, hardware or a combination thereof. As shown in FIG. 2, in an embodiment, the device of inputting text based on hand gesture recognition includes an image collection module 110, a target acquiring module 120, a trace extraction module 130, a character recognition module 140, and a display module 150. The image collection module 110 is configured to collect image information containing a target object. The target acquiring module 120 is configured to determine the target object according to the image information, and acquire a writing plane and a movement trace of the target object. The trace extraction module 130 is configured to extract the movement trace of the target object in the writing plane as a writing trace, outputting the writing trace. The character recognition module 140 is configured to perform character recognition according to the writing trace, and output a character recognition result.

The image collection module 110 is a camera that is configured to collect image information containing a target object. In an embodiment, the target object can be a finger of a user, or a stick-like object held by the user, such as a pencil.

For example, when the user needs to write in the air using the pencil as the target object, it is only required to hold the pencil and place the pencil in a visible area of the camera, then the image collection module 110 will collect the image information containing the pencil.

In an embodiment, the device of inputting text based on hand gesture recognition also includes a hand gesture recognition module and/or a voice recognition module. The hand gesture recognition module is configured to recognize the hand gesture of the user and output a hand gesture recognition result, and the hand gesture recognition result is to start or end a writing status. The hand gesture recognition module is configured to recognize the hand gesture of the user and output a hand gesture recognition result, and the hand gesture recognition result is to start or end a writing status.

In particular, when the user needs to start a writing status, a corresponding hand gesture can be made within the visible area of the image collection module 110. When the hand of the user appears in the visible area of the image collection module 110, the hand gesture recognition module will automatically adapt the visible area of the image collection module 110 for the collection of hand gesture images (such as focusing on the hand of the user and zooming in with the lens), and a hand gesture recognition result will be output by the hand gesture recognition module, i.e., starting writing status. It should be understood that the user can also start the writing status by way of voice directly, such as say "start writing" to a microphone for collecting voice, then the voice recognition module will output a voice recognition result, i.e., starting the writing status.

Correspondingly, when the user needs to end the writing status, a corresponding hand gesture can be made within the visible area of the image collection module 110, the hand gesture recognition module will output a hand gesture recognition result, i.e., ending the writing status. It should be understood that the user can also end the writing status by way of voice directly, such as say "end writing" to the microphone for collecting voice, then the voice recognition module will output a voice recognition result, i.e., ending the writing status.

The target acquiring module 120 is configured to determine the target object according to the image information, and acquire a writing plane and a movement trace of the target object.

Figure 3:
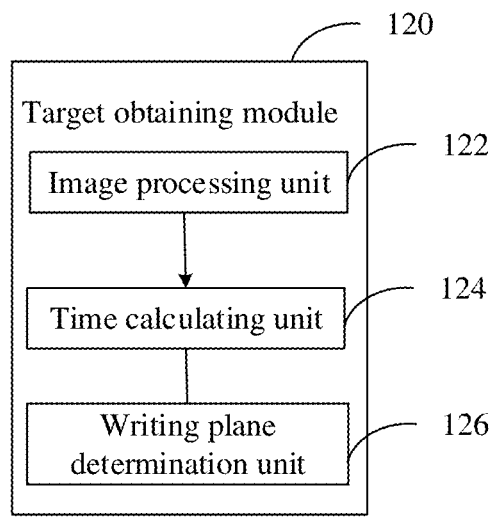
FIG. 3 is a block diagram of a target acquiring module according to the embodiment shown in FIG. 2.

Referring to FIG. 3, in an embodiment, the target acquiring module 120 includes an image processing unit 122, a time calculation unit 124, and a writing plane determination unit 126.

In particular, the image processing unit 122 is configured to perform image characteristic extraction to the image information to determine the target object. The image characteristics herein mainly refer to acquiring image contours of the digital image by an edge extraction. Typically, a place where the gray scale value changes drastically is defined an edge. If the target object is a finger or a pencil or other rod-like object, then the edge of the image is a very critical characteristic. By extracting the image characteristics, the target object can be determined swiftly.

The time calculation unit 124 is configured to count a pause duration of the target object at a position. In particular, when the target object is determined, a tracking of the target object can be achieved. When the target object is static, the time calculating unit 124 will start timing which is stopped when the target object starts moving again, the duration elapsed therebetween is the pause duration of the target object at the position.

The writing plane determination unit 126 is configured to acquire a first position where the pause duration of the target object reaches a preset duration for a first time after starting the writing status, and acquire a second position where the pause duration of the target object reaches the preset duration for a second time; and defining the movement trace of the target object from the first position to the second position as a first stroke, defining a plane where the first stroke is located as a reference writing plane, and defining a plane away from the reference writing plane within a preset distance range as a writing plane.

For example, when the writing status is started, the first position where the pause duration of the target object reaches the preset duration for the first time is defined A, the second position where the pause duration of the target object reaches the preset duration for the second time is defined B, then a connecting line between A and B constitutes a reference writing plane. It should be understood that the movement trace from target objects A to B is the very first stroke of the character the user input. The determination of the reference writing plane, in fact is in combination with the spatial position where the first stroke located, and the writing range of the human arm.

In addition, it should be understood that, in alternative embodiments, the writing plane determination unit 126 can also use other manners to define the reference writing plane, such as by a particular hand gesture to start the writing status, and regard the plane where one end for writing of the target object located as the reference writing plane. For another example, the writing status is started by voice, then the target object stay for a period of time at the position about to write, and the plane where the target object stayed is defined the reference writing plane. For a third example, the writing status is started by voice, gesture, remote control or any other means, the target object moves forward or downward rectilinearly at a certain speed to a position and stay for a while, the plane where such position located is defined the reference writing plane. For a fourth example, the trace of the target object in the air turned and stayed in a position after an "L"-like trace is drew, the plane where such a position is drew is defined the reference writing plane. The determination of whether an "L"-like trace is drew by the target object is mainly to track the target object to acquire the movement trace of the target object, and then determine if the movement trace is "L"-like. The reference writing plane can be defined by a combination of the foregoing manners.

After the reference writing plane is determined, in view that it is impossible that every stroke fall into a same plane during writing in the air, i.e., every movement trace of the target object will have a respective intersection angle in relation to the reference writing plane, the plane whose intersection angle in relation to the writing plane is within a preset angle range (e.g., within 30 degrees) is defined as the writing plane, which equivalent to regarding the writing plane as a set of planes, and the movement traces in all of the planes in the set are then extracted, so as to facilitate the improvement of the precision of character recognition.

In an embodiment, the preset duration is two seconds, i.e., the user will control the target object to pause over two seconds both in starting and ending the stroke. It should be understood that, the preset duration can be set as one second, two seconds, or three seconds etc., no limitation is intended herein.

The trace extraction module 130 is configured to extract the movement trace of the target object in the writing plane as a writing trace, outputting the writing trace.

Figure 4:
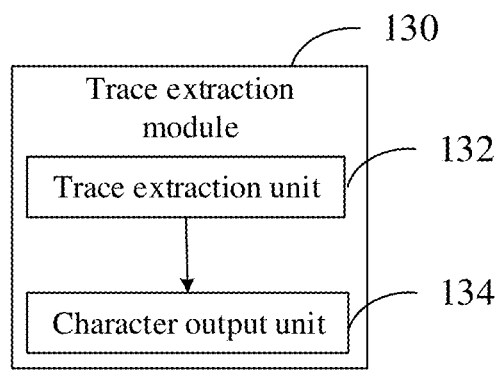
FIG. 4 is a block diagram of a trace extraction module according to the embodiment shown in FIG. 2.

Referring to FIG. 4, in an embodiment, the trace extraction module 130 includes a trace extraction unit 132 and a character output unit 134.

The trace extraction unit 132 is configured to extract the movement trace of the target object in the writing plane as a writing trace.

The character output unit 134 is configured to output the writing trace with the characters as the unit. In particular, in the process of writing by the user, the target object pause for a certain period of time upon completing of the input of a character. In an embodiment, assuming the threshold of interval to be four seconds, when the pause duration of the target object exceeds four seconds, it is considered that the user has completed the input of a character. The character can be the Chinese character, the letter, the digit, the symbol, or other individual characters input by the user.

The character recognition module 140 is configured to perform character recognition according to the writing trace, and output a character recognition result. In particular, the character recognition module 140 will compare the writing trace (i.e., the output character) output by the trace extraction module 130 to the character in the preset character base and find out from the character base a character with the highest similarity to the writing trace as the character recognition result to output.

Figure 5:
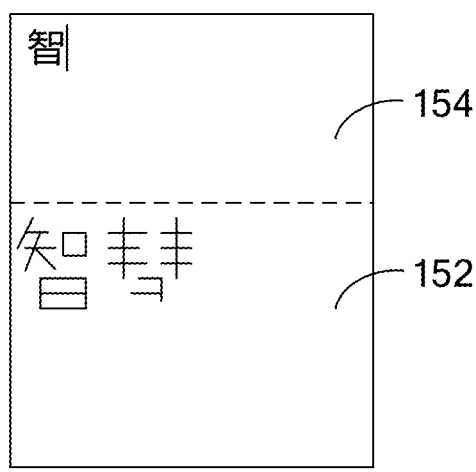
FIG. 5 is a schematic diagram of a writing in the air according to an embodiment.

The display module 150 is configured to display the character recognition result and/or the writing trace. Referring to FIG. 5 for details, the display module 150 includes a writing display zone 152 and a recognition zone 154. The writing display zone 152 will display the writing trace output by the trace extraction module 130, the recognition display zone 154 will display the character recognition result output by the character recognition module 140.

In an embodiment, the display module 150 displays the writing trace in real time, and when the writing trace is output with the characters as the unit to the character recognition module 140, the display module 150 will then display the character recognition result output by the character recognition module 140.

In particular, the display module 150 includes a target object detection unit and a display unit. The target object detection unit is configured to detect if the target object is departing the writing plane in an angle between 45 and 90 degrees in relation to the reference writing plane, or to detect if the target object is departing the writing plane at a preset speed; if yes, then the display unit stops displaying the writing trace. The target object detection unit is further configured to detect if the target object is arriving the writing plane in the angle between 45 and 90 degrees in relation to the reference writing plane, or to detect if the target object is arriving the writing plane at the preset speed, or detecting if the target object is arriving the writing plane in an "L"-like movement trace; if yes, the target object detection unit starts displaying the writing trace. To determine if an "L"-like trace is drew by the target object, it is mainly to track the target object to acquire the movement trace of the target object, and then determine if the movement trace is "L"-like.

Additionally, a size adjustment module is included, which is configured to adjust the size of the character according to a distance between one end of the target object proximately to the reference writing plane and the reference writing plane.

In particular, the end of the target object near the reference writing plane can be understood as the pen point, the farther the pen point away from the reference writing plane, the thinner the stroke of the character. In contrast, the nearer the pen point away from the reference writing plane, the thicker the stroke of the character.

Furthermore, if a stroke that the target object arrives at the reference writing plane in an angle close to 90 degrees and at a speed close to a speed threshold and stayed for a certain period of time is defined to be a "down stroke"; and a stroke that departs from the reference writing plane in an angle close to 90 degrees and at a speed close to the speed threshold is defined to be a "up stroke", then the size adjustment module can also be configured to effect an adjustment of the displayed character from being thin to being thick according to the extension of the pause in the first down stroke. Also, the farther the target object is away from the reference writing plane, the thinner the stroke at the up stroke. When the distance target object is away from the reference writing plane amounts to a certain value, it is considered the "up stroke" is finished and a process of distinguishing the strokes is performed.

Alternatively, in an embodiment, it can be defined a "down stroke" that the target object arrives the writing plane in an "L"-like movement trace, and a "up stroke" that the target object departs the writing plane in an "L"-like movement trace. In particular, after approaching the writing plane, it takes a sharp turn at near 90 degrees, and starts moving in the writing plane, then it is determined that it is an "L"-like movement trace that arrived at the writing plane; in the opposite, the target object, while moving in the writing plane, takes a sharp turn at near 90 degrees in a sudden and leaves the writing plane, then it is determined it is an "L"-like movement trace that departed from the writing plane.

Figure 6:
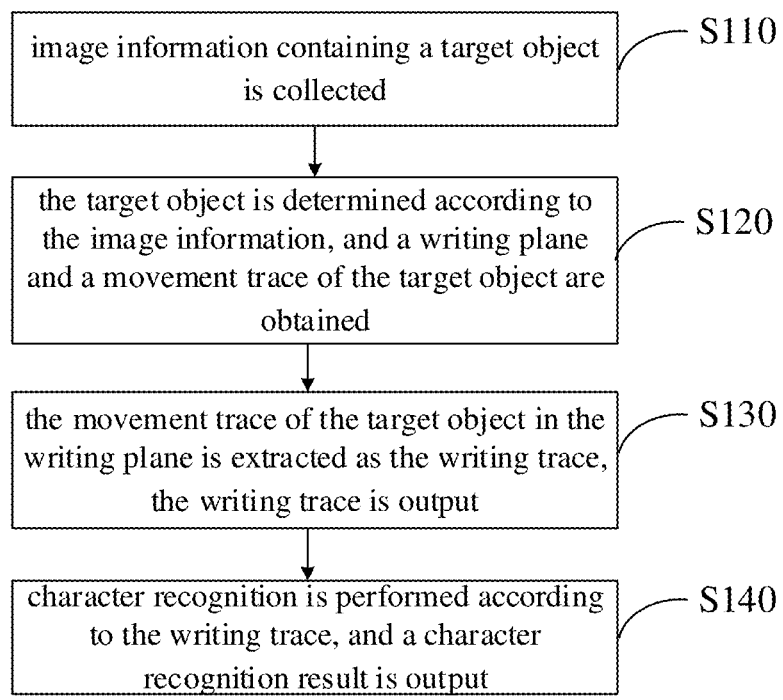
FIG. 6 is a flowchart of a method of inputting text based on hand gesture recognition according to an embodiment.

FIG. 6 is a flowchart of a method of inputting text based on hand gesture recognition according to an embodiment.

A method of inputting text based on hand gesture recognition includes:

In step S110, image information containing a target object is collected;

In an embodiment, the target object can be a finger of a user, or a stick-like object held by the user, such as a pencil.

In step S120, the target object is determined according to the image information, and a writing plane and a movement trace of the target object are acquired.

In an embodiment, in step S120, a size of the character is adjusted according to a distance between one end of the target object proximately to the reference writing plane and the reference writing plane.

In step S130: the movement trace of the target object in the writing plane is extracted as the writing trace, the writing trace is output.

In an embodiment, the output is performed with the characters as the unit in step S130.

In step S140, character recognition is performed according to the writing trace, and a character recognition result is output.

Figure 7:
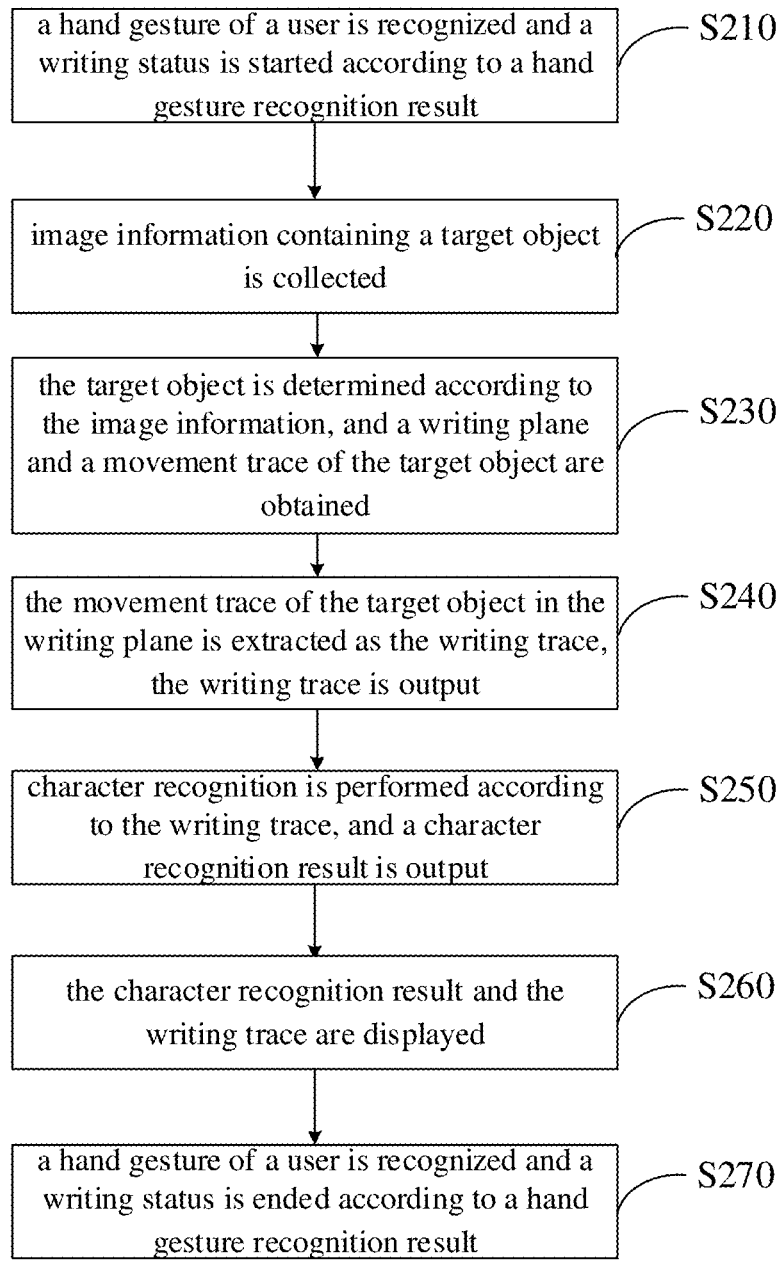
FIG. 7 is a flowchart of a method of inputting text based on hand gesture recognition according to another embodiment.

FIG. 7 is a flowchart of a method of inputting text based on hand gesture recognition according to another embodiment.

A method of inputting text based on hand gesture recognition, the method includes:

In step S210: a hand gesture of a user is recognized and a writing status is started according to a hand gesture recognition result.

In an embodiment, step S210 can also be that a voice of a user is recognized and the writing status is started according to a voice recognition result.

In step S220: image information containing a target object is collected.

In step S230: the target object is determined according to the image information, and a writing plane and a movement trace of the target object are acquired.

In step S240: the movement trace of the target object in the writing plane is extracted as the writing trace, the writing trace is output.

In step S250, character recognition is performed according to the writing trace, and a character recognition result is output.

In step S260, the character recognition result and the writing trace are displayed.

In particular, the writing trace is first displayed and then the character recognition result is displayed, it is because the writing trace is displayed in real time. In an embodiment, it can only display the character recognition result or the writing trace.

In an embodiment, the step of displaying the writing trace in step S260 includes:

It is detected if the target object is departing the writing plane in an angle between 45 and 90 degrees in relation to the reference writing plane, or it is detected if the target object is departing the writing plane at a preset speed; if yes, stop displaying the writing trace; and It is detected if the target object is arriving the writing plane in the angle between 45 and 90 degrees in relation to the reference writing plane, or it is detected if the target object is arriving the writing plane at the preset speed, or detecting if the target object is arriving the writing plane in an "L"-like movement trace; if the target object is arriving the writing plane in the angle between 45 and 90 degrees in relation to the reference writing plane or the target object is departing the writing plane at the preset speed or the target object is arriving the writing plane in the "L"-like movement trace, start displaying the writing trace.

In step S270: a hand gesture of a user is recognized and a writing status is ended according to a hand gesture recognition result.

In an embodiment, step S270 can also be that a voice of a user is recognized and the writing status is ended according to a voice recognition result.

The principle of the method of inputting text based on hand gesture recognition in the foregoing embodiment will be described through specific an application scenario where, as an example, the target object is a finger that writes a Chinese character "义" in the air.

Figure 8:
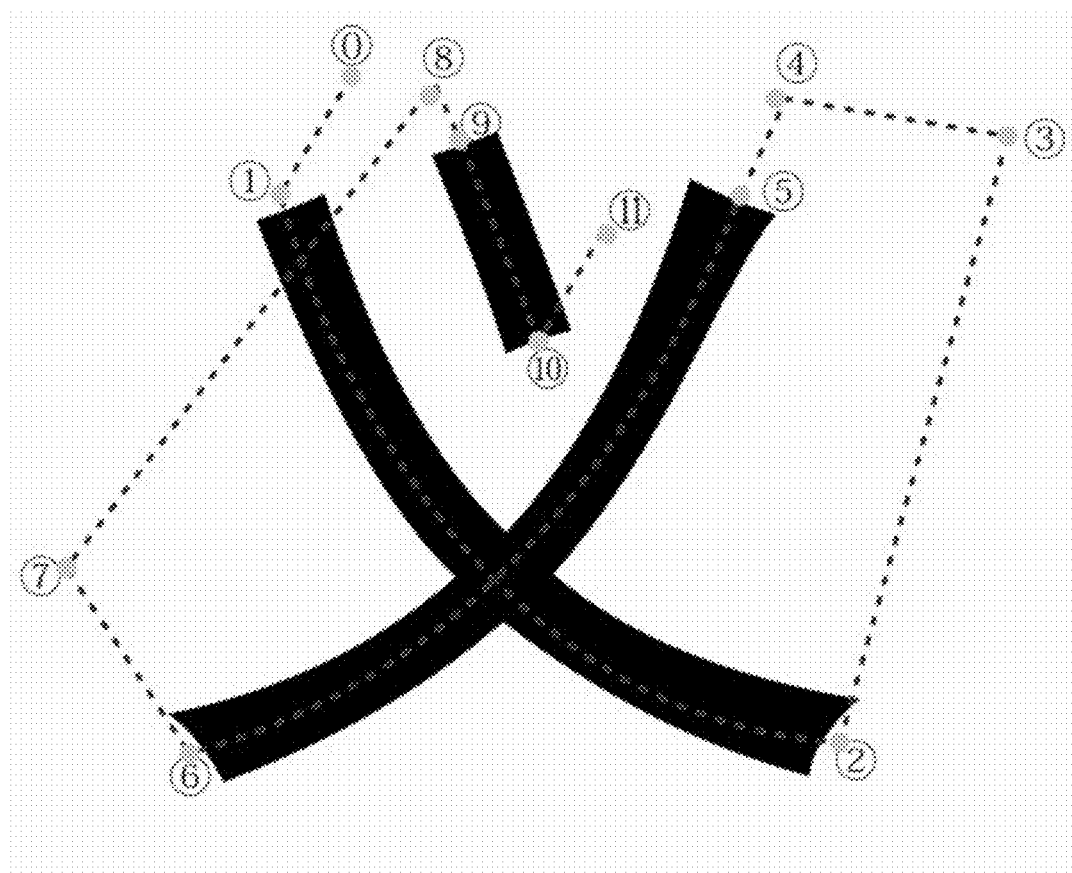
FIG. 8 is a schematic diagram of an application of a method of inputting text based on hand gesture recognition according to an embodiment.

The user shows his/her finger in the visible range of the camera, and starts the writing status by voice. As illustrated in FIG. 8, it is the down stroke the finger of the user moving from position "0" to the first stroke starting point position "1", from position "1" to position "2" is a first stroke, and the plane where the first stroke locates is defined the writing plane. From position "2" to position "3" is an up stroke, moving from position "3" to position "4" is a movement outside the writing plane. From position "4" to position "5" is a second down stroke, and from position "5" to position "6" is a second stroke. From position "6" to position "7" is the up stroke, moving from position "7" to position "8" is a movement outside the writing plane. From position "8" to position "9" is a third stroke, from position "9" to position "10" is a third stroke, from position "10" to position "11" is the up stroke, and the input of a character is completed. The finger of the user will make a pause at position "1", position "2", position "5", position "6", position "9" and position "10", although the movement trace of the finger of the user from position "0" to position "11" is consecutive, yet as only the movement trace in the writing plane is extracted as writing trace, this amounts to a strokes distinguishing process, which can improve the recognition precision of the input character, facilitates the user to perform inputting text, and helps to train the kids with good a writing manner.

According to the foregoing method of inputting text based on hand gesture recognition, the target object is determined according to the image information, and the writing plane and the movement trace of the target object are acquired, the movement trace of the target object in the writing plane is extracted as the writing trace to be output, the character recognition is performed according to the writing trace, and the character recognition result is output, such that even if the movement trace of the target object in the air in consecutive, yet the trace extraction module will only extract the writing trace in the writing plane, which is equivalent to a strokes distinguishing process and facilitates the recognition of the character recognition module and improves the precision of recognition.

In an embodiment, at least one non-transitory computer-readable storage medium is also provided, which stores computer-readable instructions that, when executed by at least one processors, cause the at least one processor to perform steps as follow:

Image information containing a target object is collected;

The target object is determined according to the image information, and a writing plane and a movement trace of the target object are acquired;

The movement trace of the target object in the writing plane is extracted as a writing trace, outputting the writing trace; and Character recognition is performed according to the writing trace, and a character recognition result is output.

A person skilled in the art should understand that the processes of the methods in the above embodiments can be, in full or in part, implemented by computer programs instructing underlying hardware, the programs can be stored in a computer-readable storage medium, the program can include the processes in the embodiments of the various methods when it is being executed. The storage medium can be a disk, a CD, a Read-Only Memory (ROM) and other non-transitory storage mediums or Random Access Memory (RAM) and so on.

The different technical features of the above embodiments can have various combinations which are not described for the purpose of brevity. Nevertheless, to the extent the combining of the different technical features do not conflict with each other, all such combinations must be regarded as being within the scope of the disclosure.

The foregoing implementations are merely specific embodiments of the present disclosure, and are not intended to limit the protection scope of the present disclosure. It should be noted that any variation or replacement readily figured out by persons skilled in the art within the technical scope disclosed in the present disclosure shall all fall into the protection scope of the present disclosure. Therefore, the protection scope of the present disclosure shall be subject to the protection scope of the claims.

What is claimed is:

1. A method of inputting text based on hand gesture recognition, comprising:
   collecting image information containing a target object;
   determining the target object according to the image information, and acquiring a writing plane and a movement trace of the target object;
   extracting the movement trace of the target object in the writing plane as a writing trace, outputting the writing trace;
   performing character recognition according to the writing trace, and outputting a character recognition result; and
   displaying the character recognition result and the writing trace;
   wherein the step of displaying the writing trace comprises;
   detecting if the target object is departing the writing plane in an angle between 45 and 90 degrees in relation to the reference writing plane, or detecting if the target object is departing the writing plane at a preset speed; if the target object is departing the writing plane in the angle between 45 and 90 degrees in relation to the reference writing plane or the target object is departing the writing plane at the preset speed, stop displaying the writing trace; and
   detecting if the target object is arriving the writing plane in the angle between 45 and 90 degrees in relation to the reference writing plane, or detecting if the target object is arriving the writing plane at the preset speed, or detecting if the target object is arriving the writing plane in an "L"-like movement trace; if the target object is arriving the writing plane in the angle between 45 and 90 degrees in relation to the reference writing plane or the target object is departing the writing plane at the preset speed or the target object is arriving the writing plane in the "L"-like movement trace, start displaying the writing trace.

2. The method of claim 1, further comprising:
   recognizing a hand gesture or a voice of a user, starting a writing status according to a hand gesture recognition result or a voice recognition result; and
   recognizing a hand gesture or a voice of the user, ending the writing status according to a hand gesture recognition result or a voice recognition result.

3. The method according to claim 2, wherein the step of determining the target object according to the image information, and acquiring the writing plane and the movement trace of the target object comprises:
   performing image characteristic extraction to the image information to determine the target object;
   counting a pause duration of the target object at a position;
   acquiring a first position where the pause duration of the target object reaches a preset duration for a first time after starting the writing status, and acquiring a second position where the pause duration of the target object reaches the preset duration for a second time; and defining the movement trace of the target object from the first position to the second position as a first stroke, defining a plane where the first stroke is located as a reference writing plane, and defining a plane away from the reference writing plane within a preset distance range as a writing plane;
   wherein the step of extracting the movement trace of the target object in the writing plane as the writing trace, outputting the writing trace comprises:
   extracting the movement trace of the target object in the writing plane as the writing trace; and
   outputting the writing trace with a character as an unit.

4. The method of claim 3, further comprising:
   adjusting a size of the character according to a distance between one end of the target object proximately to the reference writing plane and the reference writing plane.

5. A device of inputting text based on hand gesture recognition, the device comprising a processor; and a memory storing instructions, which, when executed by the processor causes the processor to perform steps comprising:
   collecting image information containing a target object;
   determining the target object according to the image information, and acquiring a writing plane and a movement trace of the target object;
   extracting the movement trace of the target object in the writing plane as a writing trace, outputting the writing trace; and
   performing character recognition according to the writing trace, and outputting a character recognition result; and
   displaying the character recognition result and the writing trace;

wherein the step of displaying the writing trace comprises:
detecting if the target object is departing the writing plane in an angle between 45 and 90 degrees in relation to the reference writing plane, or detecting if the target object is departing the writing plane at a preset speed; if the target object is departing the writing plane in the angle between 45 and 90 degrees in relation to the reference writing plane or the target object is departing the writing plane at the preset speed, stop displaying the writing trace; and
detecting if the target object is arriving the writing plane in the angle between 45 and 90 degrees in relation to the reference writing plane, or detecting if the target object is arriving the writing plane at the preset speed, or detecting if the target object is arriving the writing plane in an "L"-like movement trace: if the target object is arriving the writing plane in the angle between 45 and 90 degrees in relation to the reference writing plane or the target object is departing the writing plane at the preset speed or the target object is arriving the writing plane in the "L"-like movement trace, start displaying the writing trace.

6. The device of claim 5, wherein the processor further executes the instructions to perform steps of:
recognizing a hand gesture or a voice of a user and outputting a hand gesture recognition result or a voice recognition result starting a writing status; and
recognizing a hand gesture or a voice of the user and outputting a hand gesture recognition result or a voice recognition result ending a writing status.

7. The device according to claim 6, wherein when the instructions are executed by the processor, the step of determining the target object according to the image information, and acquiring the writing plane and the movement trace of the target object comprises:
performing image characteristic extraction to the image information to determine the target object;
counting a pause duration of the target object at a position;
acquiring a first position where the pause duration of the target object reaches a preset duration for a first time after starting the writing status, and acquiring a second position where the pause duration of the target object reaches the preset duration for a second time; and
defining the movement trace of the target object from the first position to the second position as a first stroke, defining a plane where the first stroke is located as a reference writing plane, and defining a plane away from the reference writing plane within a preset distance range as a writing plane;
the step of extracting the movement trace of the target object in the writing plane as the writing trace, outputting the writing trace comprises:
extracting the movement trace of the target object in the writing plane as the writing trace; and
outputting the writing trace with a character as a unit.

8. The device of claim 7, wherein the processor further executes the instructions to perform steps of:
adjusting a size of the character according to a distance between one end of the target object proximately to the reference writing plane and the reference writing plane.

9. At least one non-transitory computer-readable storage medium storing computer-readable instructions that, when executed by at least one processors, cause the at least one processor to perform steps comprising:
collecting image information containing a target object;
determining the target object according to the image information, and acquiring a writing plane and a movement trace of the target object;
extracting the movement trace of the target object in the writing plane as a writing trace, outputting the writing trace; and
performing character recognition according to the writing trace, and outputting a character recognition result; and
displaying the character recognition result and the writing trace;
wherein the step of displaying the writing trace comprises:
detecting if the target object is departing the writing plane in an angle between 45 and 90 degrees in relation to the reference writing plane, or detecting if the target object is departing the writing plane at a preset speed; if the target object is departing the writing plane in the angle between 45 and 90 degrees in relation to the reference writing plane or the target object is departing the writing plane at the preset speed, stop displaying the writing trace; and
detecting if the target object is arriving the writing plane in the angle between 45 and 90 degrees in relation to the reference writing plane, or detecting if the target object is arriving the writing plane at the preset speed, or detecting if the target object is arriving the writing plane in an "L"-like movement trace; if the target object is arriving the writing plane in the angle between 45 and 90 degrees in relation to the reference writing plane or the target object is departing the writing plane at the preset speed or the target object is arriving the writing plane in the "L"-like movement trace, start displaying the writing trace.

* * * * *